United States Patent [19]
Murai

[11] Patent Number: 5,430,879
[45] Date of Patent: Jul. 4, 1995

[54] PROGRAMMABLE CONTROLLER HAVING A MEANS TO ACCEPT A PLURALITY OF I/O DEVICES MOUNTABLE IN ARBITRARY SLOTS

[75] Inventor: Michio Murai, Tokyo, Japan

[73] Assignee: Kabushiki Kaisha Toshiba, Kawasaki, Japan

[21] Appl. No.: 93,035

[22] Filed: Jul. 19, 1993

Related U.S. Application Data

[63] Continuation of Ser. No. 603,362, Oct. 26, 1990, abandoned.

[30] Foreign Application Priority Data

Oct. 30, 1989 [JP] Japan .................. 1-279645

[51] Int. Cl.⁶ .................. G06F 9/00; G06F 13/10
[52] U.S. Cl. .................. 395/725; 395/325; 395/275; 364/DIG. 1; 364/230; 364/230.1; 364/230.2; 364/235; 364/238.3; 364/240; 364/241.2; 364/241.3; 364/241.9; 364/262.6
[58] Field of Search .................. 395/325, 275, 725

[56] References Cited

U.S. PATENT DOCUMENTS

| | | | |
|---|---|---|---|
| 3,832,692 | 8/1974 | Henzel et al. | 395/325 |
| 4,030,075 | 6/1977 | Barlow | 395/325 |
| 4,442,502 | 4/1984 | Friends et al. | 395/325 |
| 4,494,192 | 1/1985 | Lew et al. | 395/325 |
| 4,559,595 | 12/1985 | Boudreau et al. | 395/325 |
| 4,562,535 | 12/1985 | Vincent et al. | 395/325 |
| 4,724,519 | 2/1988 | Barlow et al. | 395/325 |
| 4,745,548 | 5/1988 | Blahut | 395/325 |
| 4,849,931 | 7/1989 | Ishii | 395/275 |
| 4,858,108 | 8/1989 | Ogawa | 395/275 |
| 4,888,684 | 12/1989 | Lilja et al. | 395/325 |
| 4,914,574 | 4/1990 | Terada et al. | 395/325 |
| 4,972,368 | 11/1990 | O'Brien et al. | 395/275 |
| 5,101,478 | 3/1992 | Fu et al. | 395/275 |
| 5,274,781 | 12/1993 | Gibart | 395/325 |

FOREIGN PATENT DOCUMENTS 1218465 2/1987 Canada .
239128 3/1987 European Pat. Off. .

*Primary Examiner*—Jack B. Harvey
*Assistant Examiner*—Ayaz R. Sheikh
*Attorney, Agent, or Firm*—Oblon, Spivak, McClelland, Maier & Neustadt

[57] ABSTRACT

Data lines constituting a data bus for connecting a plurality of parallel I/O devices are assigned in a one-to-one correspondence with the I/O devices. Each I/O device outputs an interrupt request to a CPU through an interrupt request line. In response to an interrupt enable signal from the CPU, each I/O device supplies information indicating its mounting position to an interface circuit as interrupt data through a data line of the data bus assigned to itself. The interface circuit has a latch circuit for latching interrupt data from the plurality of I/O devices, a circuit for setting the priority of interrupt data latched by the latch circuit, and a circuit for generating an interrupt vector on the basis of interrupt data having the highest priority in accordance with the set priority order.

3 Claims, 6 Drawing Sheets

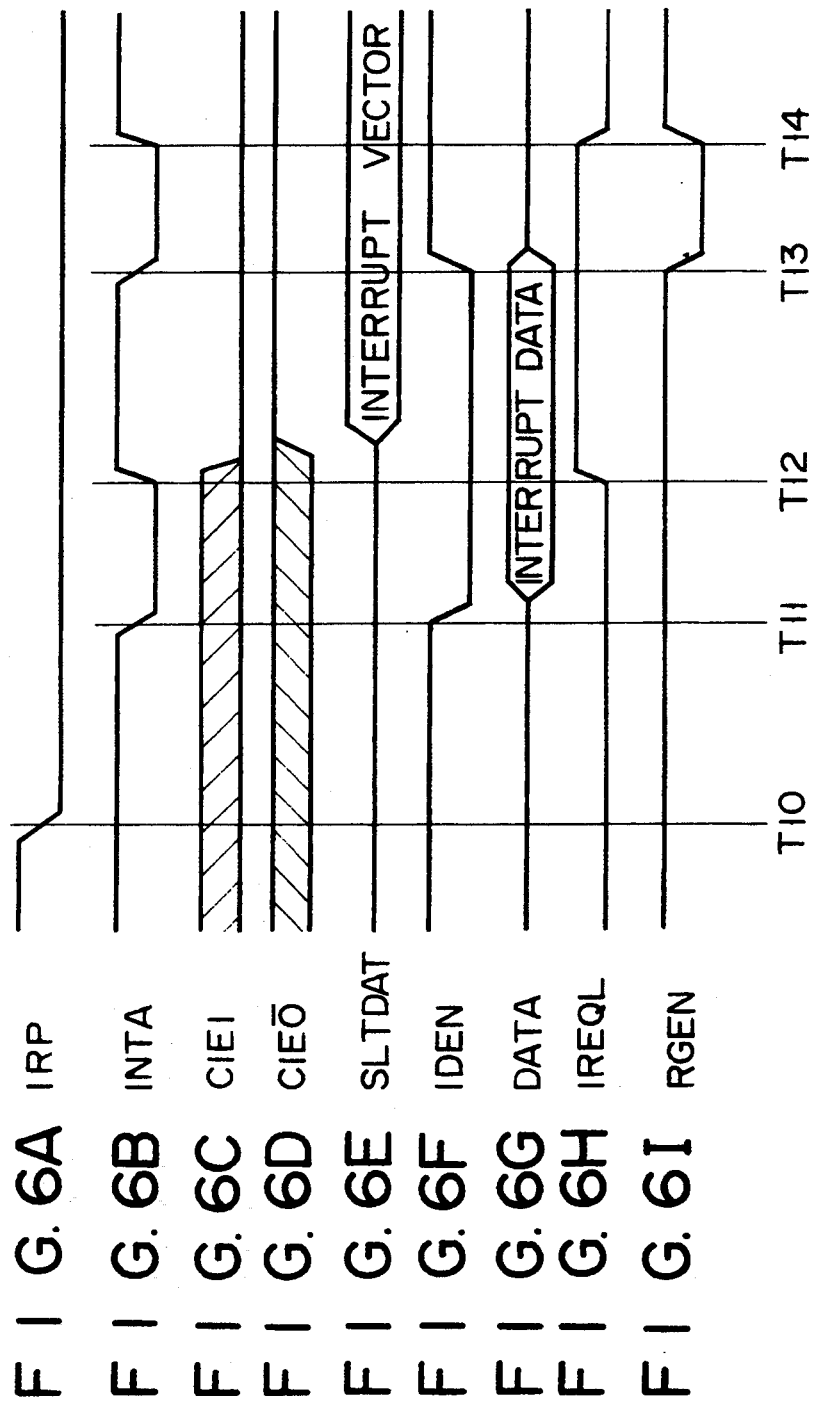

PROGRAMMABLE CONTROLLER HAVING A MEANS TO ACCEPT A PLURALITY OF I/O DEVICES MOUNTABLE IN ARBITRARY SLOTS

This application is a continuation of application Ser. No. 07/603,362, filed on Oct. 26, 1990, now abandoned.

BACKGROUND OF THE INVENTION

1. Field of the Invention

The present invention relates to a programmable controller and, more particularly, to a programmable controller having an interrupt control means for, when a plurality of parallel input/output devices (I/Os) generate interrupt processing requests, determining a priority of interrupt processing of each I/O and generating an interrupt vector.

2. Description of the Related Art

A conventional interrupt control method performed by a programmable controller is shown in FIG. 1.

FIG. 1 is a block diagram showing a conventional programmable controller.

Referring to FIG. 1, a central processing unit (CPU) 1 is connected to a random access memory (RAM) 3, a read only memory (ROM) 5, and a basic unit 7 through an internal bus. The CPU 1 performs data processing or interrupt service processing for I/Os 9a, 9b, and 9c.

The RAM 3 has a function as a main memory and is used to store various data. The ROM 5 stores control programs to be executed by the CPU 1. The basic unit has the plurality of I/Os 9a, 9b, and 9c arranged in a daisy chain, an interface circuit 11 for interfacing the CPU 1 with the I/Os 9a, 9b, and 9c, and a data bus 13 for connecting the I/Os 9a, 9b, and 9c and the interface circuit 11. In this case, the I/O 9a located closest to the CPU 1 has the highest priority. The I/Os 9a, 9b, and 9c are connected to the interface circuit 11 through an interrupt request line 15 having a wired-OR arrangement. The interface circuit 11 has an interrupt signal controller 17 and an OR gate 19.

The basic unit 7 is further connected to an extended unit 21 through an extended bus CDATA. Note that only one extended unit 21 is shown in FIG. 1 for illustrative simplicity, but a plurality of extended units can be connected in a daisy chain manner. The basic unit 7 located closest to the CPU 1 has the highest priority, and lower priorities are sequentially assigned to the extended units. Similar to the basic unit 7, the extended unit 21 has a plurality of I/Os 9a, 9b, and 9c, a data bus 13, and an interrupt request line 15. The extended unit 21 further includes an interface circuit 23 connected to the I/Os 9a, 9b, and 9c through the data bus 13. The interface circuit 23 has an interrupt controller 25. The interrupt controller 25 sends interrupt request signals IRP supplied from the I/Os 9a, 9b, and 9c through the interrupt request line 15 to the interface circuit 11 of the basic unit 7. Therefore, the interrupt request signal IRP from the basic unit 7 and the interrupt request signal IRP from the extended unit 21 are ORed by the OR gate 19 and the obtained signal is supplied to the CPU 1 as a CPU interrupt request signal 27.

when the CPU 1 receives the CPU interrupt request signal 27, it outputs an interrupt accept signal INTA to the interface circuit 11. The interrupt signal controller 17 generates an acknowledge signal INTAC at the leading edge of the first interrupt accept signal INTA. If an interrupt request is output from the basic unit 7, the controller 17 outputs an active interrupt enable signal BIEI to the first I/O 9a and an inactive unit interrupt enable signal CIEI to the extended unit 21 in order to accept the interrupt request from the basic unit 7 having the higher priority order than that of the extended unit 21. If the first I/O 9a itself outputs an interrupt request, it outputs an inactive interrupt enable signal BIEO to the second I/O 9b. If the first I/O 9a itself does not output an interrupt request, it outputs an active interrupt enable signal BIEO to the next stage. In the same manner, the interrupt request signal is sequentially transferred to an interrupt request source. When an active interrupt enable signal is transferred to the interrupt request source, an inactive interrupt enable signal BIEO is output to I/Os after the request source.

If no interrupt request is output from the basic unit 7, the interrupt signal controller 17 outputs an active unit interrupt enable signal CIEI to the extended unit 21 in synchronism with the acknowledge signal INTAC. As a result, an interrupt request from the extended unit 21 is accepted.

The interface circuit 23 in each extended unit 21 controls interrupt requests between the extended units 21 and interrupt requests from the I/Os 9a, 9b, and 9c in the extended unit 21. When the interrupt controller 25 in the extended unit 21 receives an active interrupt enable signal CIEI from the basic unit 7, it outputs an I/O interrupt enable signal IEI to the first I/O 9a. If the first I/O 9a itself does not output an interrupt request, it outputs an interrupt enable signal IEO to the second I/O 9b. In the same manner, the interrupt enable signal is sequentially transferred to an I/O of an interrupt request source.

FIG. 2 is a circuit diagram showing in detail the I/O 9a of the interface circuit 23 shown in FIG. 1. Note that circuit arrangements of the other I/Os 9b and 9c are the same as that of the I/O 9a. FIGS. 3A through 3H are timing charts in which: FIG. 3A is a timing chart showing an acknowledge signal INTA; FIG. 3B, an interrupt request signal IRP; FIG. 3C, an interrupt enable signal CIEI for an extended unit; FIG. 3D, a unit interrupt enable signal CIEO; FIG. 3E; an I/O interrupt enable signal IEI; FIG. 3F, a processing request signal INT; FIG. 3G, an output IEO from an AND gate 206; and FIG. 3H, data on a data bus 31.

Referring to FIG. 2, when the I/O 9a, 9b, or 9c in the extended unit 21 is to output an interrupt processing request to the CPU 1, an interrupt request circuit 203 sets a processing request signal INT shown in FIG. 3F to be low active at a timing T1 in accordance with an interrupt factor. The processing request signal INT is output from an output buffer 207 (open collector), wired-ORed, and output onto the interrupt request line 15. The signal on the interrupt request line 15 is fetched by the CPU 1 as an interrupt request signal IRP (FIG. 3B). When the CPU 1 accepts the interrupt request signal IRP, it outputs an interrupt acknowledge signal INTA (FIG. 3A) to the interrupt controller 17 at a timing T2. Since the interrupt request is not from the I/Os 9a, 9b, and 9c of the unit including the interrupt controller 17, the controller 17 outputs an acknowledge signal INTAC to the interrupt controller 25 in the extended unit 21. If the interrupt request signal IRP is active, the interrupt controller 25 sets a unit interrupt accept signal 123 to be active in synchronism with the signal INTAC. At this time, if a unit interrupt enable signal CIEI (FIG. 3C) is active, the controller 25 sets an I/O interrupt enable signal IEI (FIG. 3E) to be active and outputs the enable signal to the I/O 9a, 9b, or 9c which outputs the interrupt request. In this case, if the I/O 9a accepts the interrupt enable signal IEI, for example, an output of an interrupt enable signal IEO (FIG. 3G) to the following I/Os 9b and 9c is disabled. If the I/Os 9a, 9b, and 9c simultaneously output the processing request signals INT, the controller 25 sets an I/O interrupt accept signal 125 to be active in synchronism with the acknowledge signal INTAC. If the I/O interrupt enable signal IEI is active, the I/O 9a sets the following I/Os 9b and 9c in an interrupt disable state at a timing T3 in accordance with the output IEO (FIG. 3G) from the AND gate 206. In addition, the I/O 9a causes an AND gate 205 to set a vector generator 208 to be active to output an interrupt vector (FIG. 3H) onto a data bus. The output vector is fetched by the CPU 1 at a timing T4.

In the above conventional system, however, if the plurality of I/Os 9a, 9b, and 9c in the unit simultaneously set the interrupt request signals IRP to be active with respect to the CPU 1, the I/O interrupt enable signal IEI is set to be active in synchronism with the acknowledge signal INTAC and sequentially transferred from the first I/O 9a. For this purpose, the I/Os must be successively mounted. That is, if a slot not mounting an I/O is present in a circuit or an interrupt enable signal line is disconnected, an interrupt enable signal cannot be supplied to an interrupt request source, and the system is hung up.

SUMMARY OF THE INVENTION

It is an object of the present invention to provide a programmable controller which can mount each I/O in an arbitrary slot and can prevent a system from being hung up even when a slot not mounting an I/O is present in a circuit.

It is another object of the present invention to provide a programable computer which can arbitrarily set an interrupt priority of each I/O.

In order to achieve the above object of the present invention, there is provided a programable controller comprising: a plurality of parallel I/O devices, each I/O device outputting information indicating its mounting position as interrupt data; data bus means connected to the plurality of I/O devices, bits constituting the data bus means being assigned in a one-to-one correspondence with the I/O devices; interrupt data latch means for simultaneously accepting the interrupt data from the plurality of I/O devices through the data bus means; and interrupt vector generating means for generating an interrupt vector by using interrupt data selected from the interrupt data latched by the latch means in accordance with a predetermined rule.

According to the present invention, data lines of a data bus normally used in data exchange between a CPU and I/Os are connected in a one-to-one correspondence with the I/Os. Each I/O has its own mounting position information detector. Each I/O sends an interrupt request signal to the CPU through an interrupt request signal line. The CPU outputs an acknowledge signal to an interrupt controller. In response to the acknowledge signal, the interrupt controller outputs an interrupt information enable signal to each I/O. In response to the interrupt information enable signal, the mounting position information detector of each I/O detects a mounting position of the I/O. On the basis of the mounting position information, a bit extracting circuit of each I/O sets a data line of a data bus corresponding to the mounting position to be active. As a result, interruption information from a plurality of I/Os are simultaneously supplied to the interrupt controller and latched.

On the basis of a predetermined interrupt priority or an interrupt priority set by a priority setting circuit, the interrupt controller selects interrupt data having the highest priority from the plurality of interrupt information, generates an interrupt vector, and sends the vector to the CPU.

According to the present invention, therefore, I/Os can be inserted in arbitrary slots and need not be successively inserted therein. In addition, although each I/O generates an interrupt vector in a conventional system, the interrupt controller generates an interrupt vector for each I/O in the present invention. Therefore, the priority of each I/O can be set by the priority setting circuit to generate an interrupt vector in an arbitrary interrupt priority order.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 6A through 6I are timing charts showing signals used in the interrupt controller shown in FIG. 4 and the input/output device shown in FIG. 5, in which FIG. 6A shows an interrupt request signal IRP output from each I/O, FIG. 6B shows an acknowledge signal INTA output from a CPU 1, FIG. 6C shows an interrupt enable signal CIEI output from an interface circuit 11 to an extended unit, FIG. 6D shows a unit interrupt enable output signal CIEO output from an interrupt controller 25, FIG. 6E shows mounting position information SLDAT output from a priority controller 101, FIG. 6F shows an interrupt information enable signal IDEN output from a timing controller 107, FIG. 6G shows data on a data bus 31, FIG. 6H shows an interrupt generation signal IRSEL output from the timing controller 107, and FIG. 6I shows a read gate enable signal RGEN.

DETAILED DESCRIPTION OF THE PREFERRED EMBODIMENTS

Figure 4:
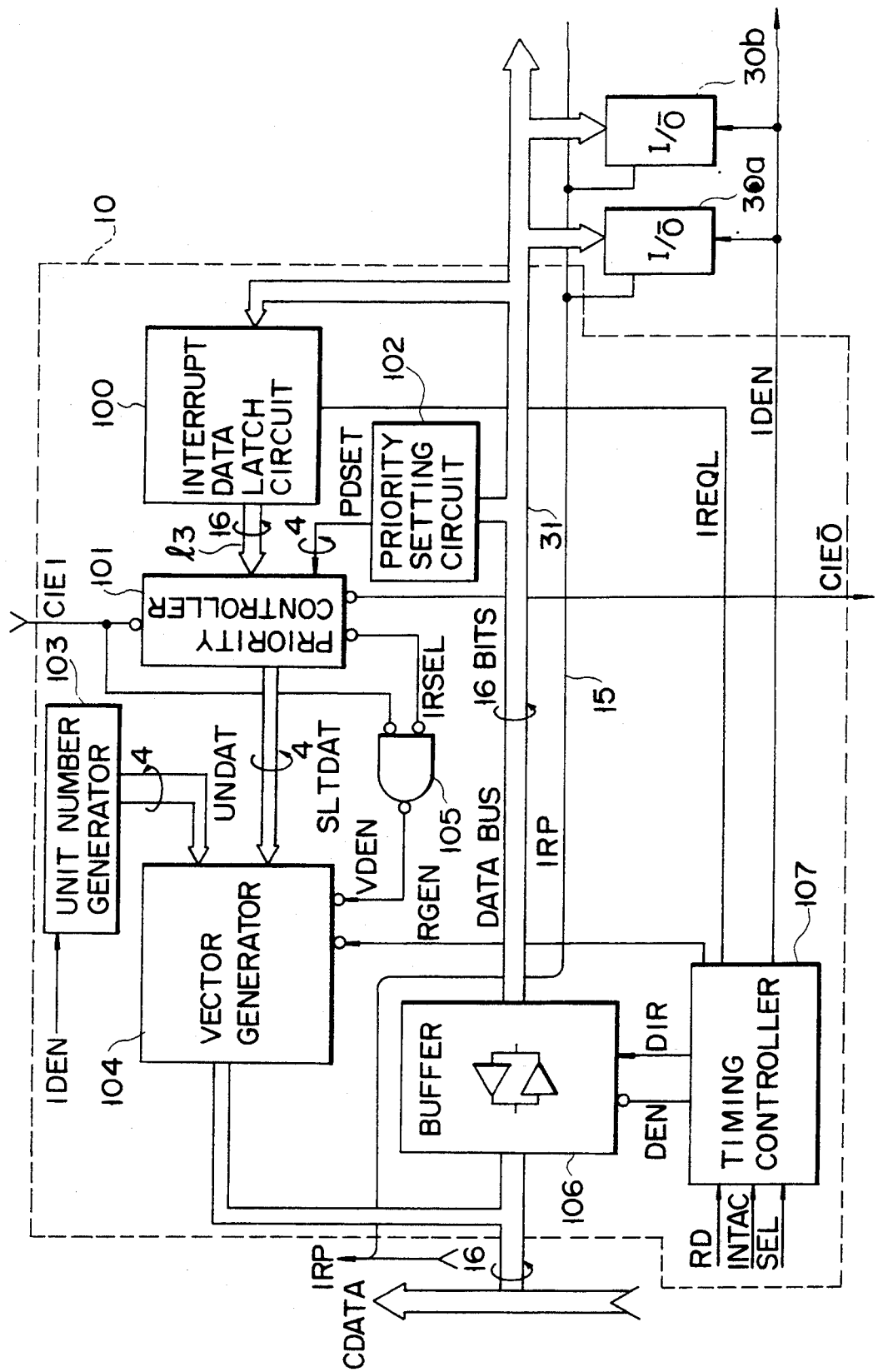
FIG. 4 is a block diagram showing an embodiment of a programmable controller according to the present invention, in which especially an interrupt controller is shown in detail.

FIG. 4 is a block diagram showing in detail an interrupt controller of a programmable controller according to the present invention. Although a CPU, a ROM, a RAM, and the like are not shown in FIG. 4 for illustrative simplicity, these parts are also included in this controller as in the conventional programmable controller shown in FIG. 1. Note that in FIG. 4, the reference numerals as in FIG. 1 denote the same parts.

For explanative convenience, an arrangement and an operation will be described below by taking an interrupt controller and an I/O in an extended unit as an example, but an arrangement and an operation of a basic unit are substantially the same. In addition, although a plurality of units can be connected also in the present invention, they are omitted for illustrative simplicity.

Figure 1:
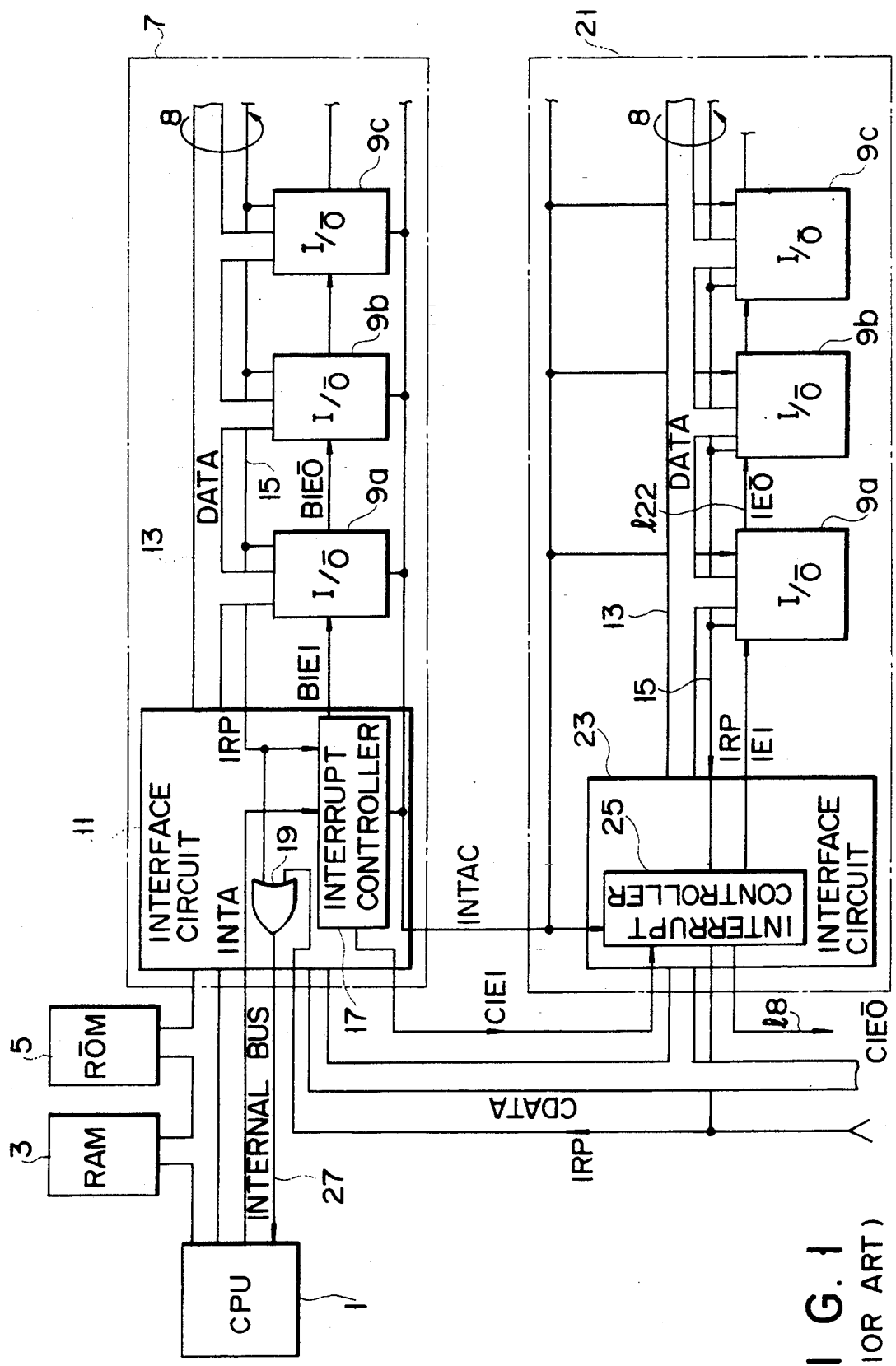
FIG. 1 is a block diagram showing an arrangement of a conventional programable controller in prior art.
Figure 2:
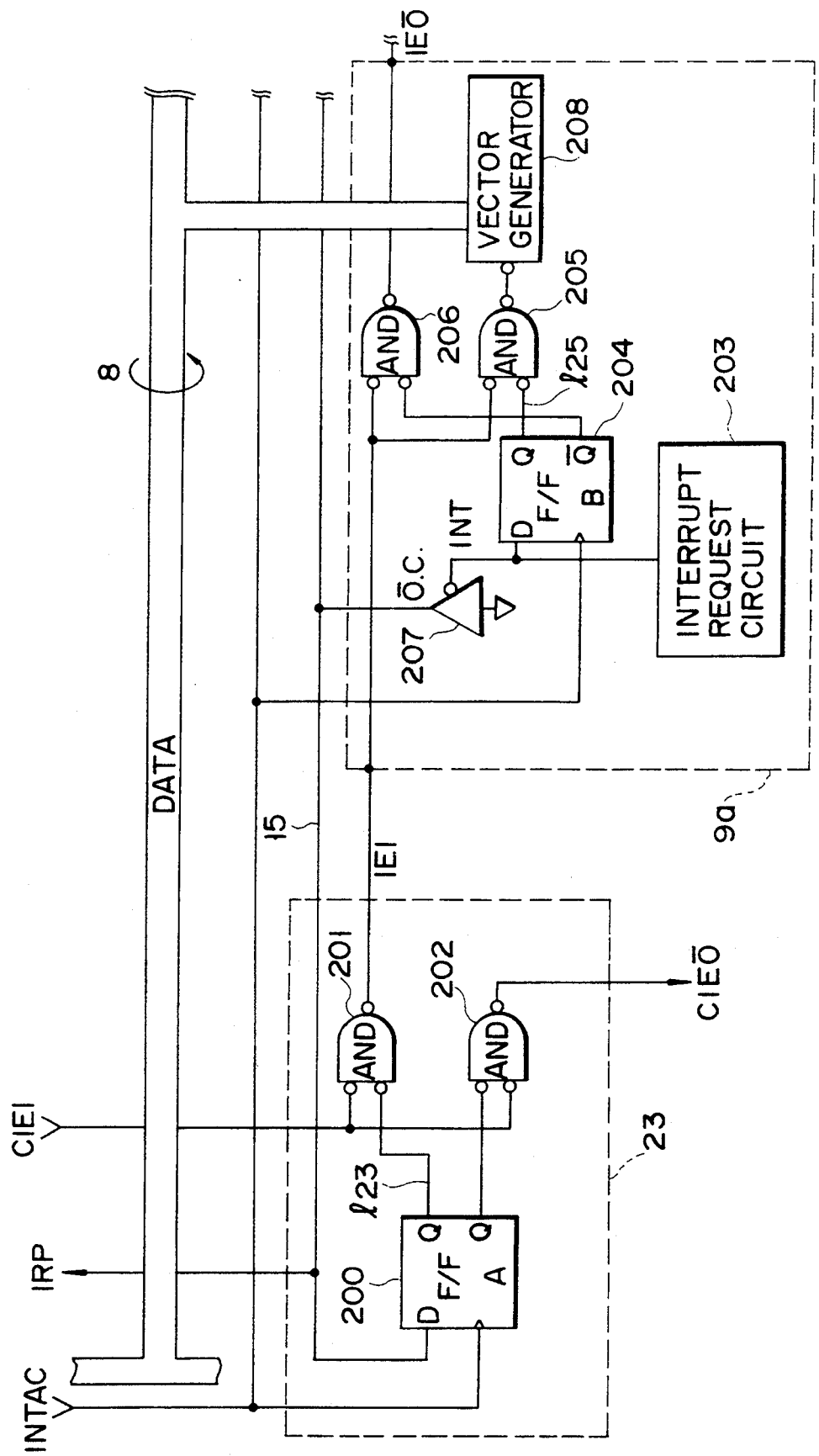
FIG. 2 is a circuit diagram showing in detail an interrupt controller and an I/O in prior art shown in FIG. 1.
Figure 3:
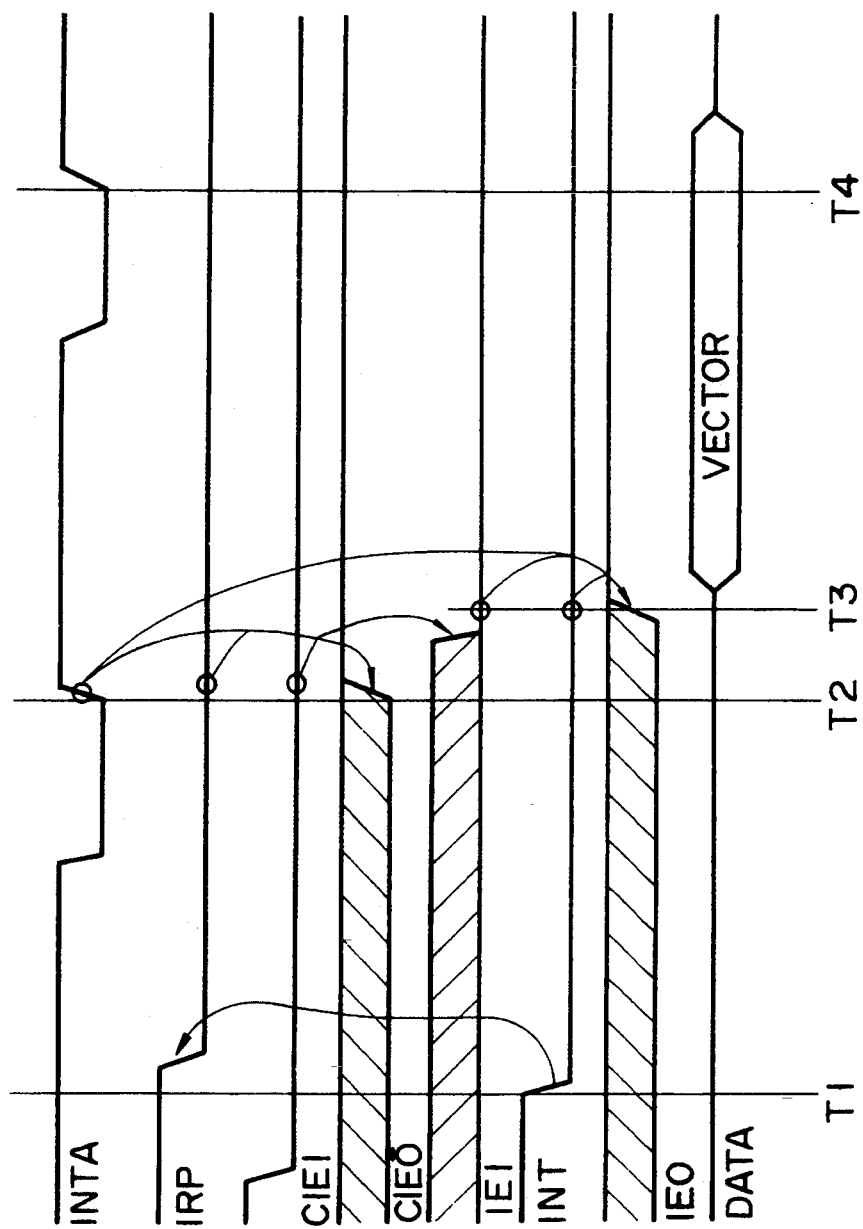
FIGS. 3A through 3H are timing charts showing signals used in the programable controller in prior art shown in FIG. 1.

I/Os 30a and 30b output interrupt request signals IRP through an interrupt request line 15 as in the conventional system shown in FIG. 1. An interrupt controller 10 is connected to the I/Os 30a and 30b through a data bus 31. The data bus 31 has 16 bits which are assigned in a one-to-one correspondence with the I/Os 30a and 30b. In this embodiment, therefore, a maximum of 16 I/Os can be connected to one extended unit.

An interrupt data latch circuit 100 is constituted by, e.g., a 16-bit register and simultaneously latches interrupt information on the data bus, i.e., mounting position information of a maximum of 16 I/Os. The output from the interrupt data latch circuit 100 is connected to the input of a priority controller 101. The priority controller 101 further receives priority information from a priority setting circuit 102, determines interrupt data having the highest priority among the plurality of interrupt data, and outputs the mounting position information to a vector generator 104. The vector generator 104 generates an interrupt vector on the basis of the mounting position information output from the priority controller 101 and a unit number output from a unit number generator 103. (The unit number is constituted by four bits. In this embodiment, therefore, a maximum of 16 units can be connected.) The generated interrupt vector is supplied to the CPU 1 through an extended data bus CDATA. A buffer 106 is a bidirectional bus used in normal data exchange between the CPU 1 and the I/O 30a. A timing controller 107 receives a read signal RD, an acknowledge signal INTAC, and a unit select signal SEL and outputs an enable signal DEN and a signal DIR indicating directivity to the buffer 106, a request latch signal IREQL to the interrupt request latch circuit 100, and an interrupt information enable signal IDEN to the I/Os 30a and 30b. The unit number generator 103 is arranged in each unit (a basic unit and an extended unit) to generate a unit number for identifying the unit and is constituted by, e.g., an adder. The generator 103 sets a unit number "0000", for example, for a unit closest to the CPU 1 and outputs unit numbers which are sequentially incremented by one. The priority setting circuit 102 sets the highest priority in one of interrupt data from a plurality of I/Os. Information indicating an I/O having interrupt data to which the highest priority is to be set is supplied from the CPU 1 to the priority setting circuit 102 through the bidirectional buffer 106.

Figure 5:
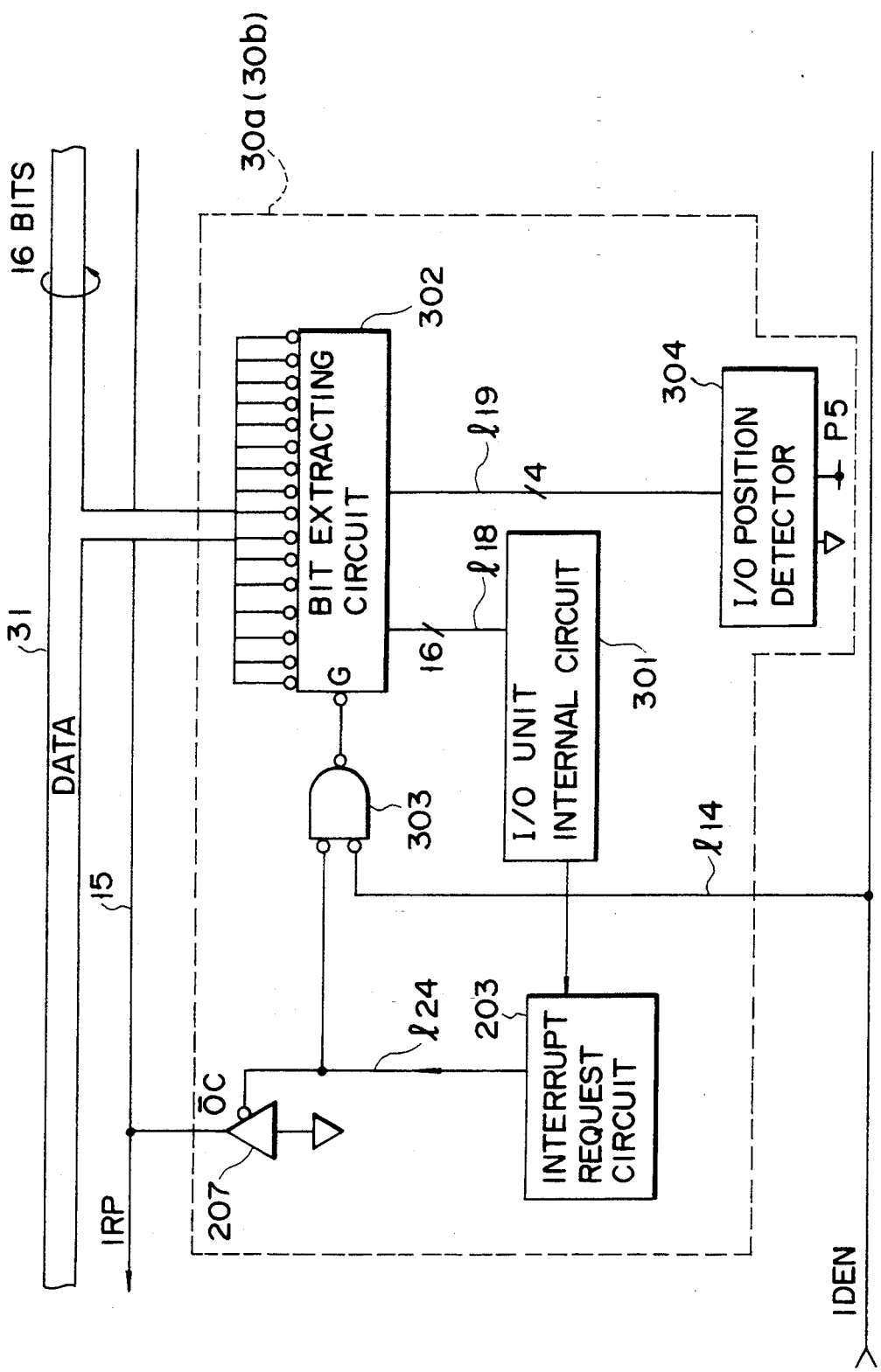
FIG. 5 is a block diagram showing in detail an input/output device shown in FIG. 4.

FIG. 5 is a circuit diagram showing in detail the I/Os 30a and 30b. Referring to FIG. 5, an interrupt request circuit 203 outputs an interrupt request processing signal 24 in response to an interrupt factor (e.g., the end of processing of the I/O 30a). The output interrupt request processing signal 124 is supplied to the interrupt request signal line 15 through an output buffer (open collector) 207, wired-ORed with an interrupt request processing signal from the other I/O 30b, and supplied to the CPU 1 as an interrupt request signal IRP. The interrupt request processing signal 124 is also supplied to one input terminal of an AND gate 303. When the interrupt request processing signal 124 is output from the interrupt request circuit 203 and an interrupt information enable signal IDEN is output from the timing controller 107, the AND gate 303 outputs an enable signal to a bit extracting circuit 302.

On the basis of the four-bit information output from four specific pins assigned to a connector of a mother board, an I/O position detector 304 detects position information indicating a mounting position of an I/O. For example, the above four specific pins are connected to the ground such that "0000" is output when the mounting position is the 0th slot. In addition, the first to third pins of the above four pins are connected to the ground and the fourth pin thereof is pulled up to +5 v such that "0001" is output when an I/O is mounted in a 1st slot. In this manner, the I/O position detector 304 outputs position information indicating "0000" through "1111" with respect to the 0th through 15th slots. An I/O unit internal circuit 301 is used in normal data exchange between the CPU 1 and the I/O 30a. Since the circuit 301 is not associated with interrupt processing, its detailed description will be omitted.

In response to the enable signal from the AND gate 303, the bit extracting circuit 302 outputs mounting position information of its own I/O onto the data bus. In this case, the bit extracting circuit 302 is constituted by, e.g., a multiplexer, and outputs a bit corresponding to the mounting position information output from the I/O position detector 304. If, for example, information output from the I/O position detector 304 is "0000", the bit extracting circuit 302 sets bit "0" to be logic "1" and all the remaining bits to be logic "0" and outputs the bits onto the data bus 31 as interrupt data. If the information output from the I/O position detector 304 is "0001", the bit extracting circuit 302 sets bit "1" to be logic "1" and all the remaining bits to be logic "0" and outputs the bits onto the data bus 31.

An operation of this embodiment having the above arrangement will be described below with reference to flow charts shown in FIGS. 6A through 6I.

Note that in the following description of this embodiment, assume that an interrupt request signal is output from an extended unit.

In response to generation of an interrupt factor, the I/O unit internal circuit 301 shown in FIG. 5 instructs the interrupt request circuit 203 to output an interrupt processing request signal. As a result, the interrupt request circuit 203 outputs an interrupt processing request signal 124 onto the interrupt request line 15 through the output buffer 207 and to one input terminal of the AND gate 303. The interrupt processing request signals on the interrupt request line 15 are wired-ORed and the obtained signal is supplied to the CPU 1 as an interrupt request signal IRP (low active) shown in FIG. 6A. In response to this interrupt request signal IRP, the CPU 1 outputs an acknowledge signal INTA shown in FIG. 6B to the interrupt controller 17 in the basic unit 7. Since an interrupt request signal is not output from the unit including the interrupt controller 17, the controller 17 determines that the acknowledge signal is output for an interrupt request signal from an extended unit and outputs a unit interrupt enable signal CIEI shown in FIG. 6C to the subsequent extended unit and the acknowledge signal INTAC to the timing controller 107 in the interrupt controller 10 in the extended unit 21. In response to the acknowledge signal INTAC, the timing controller 107 outputs an inactive enable signal DEN to cut off the buffer 106 and outputs an interrupt data enable signal IDEN shown in FIG. 6F to the I/Os 30a and 30b. In response to the interrupt data enable signal IDEN, the I/O position detector 304 outputs I/O mounting position information to the bit extracting circuit 302. Meanwhile, the interrupt data enable signal is applied to the AND gate 303. Since an AND condition is satisfied, the AND gate 303 outputs an enable signal to the bit extracting circuit 302. As a result, the bit extracting circuit 302 outputs bit information corresponding to the I/O mounting position information onto the data bus 31 as interrupt information shown in FIG. 6G. Then, since the timing controller 107 outputs a request latch signal IREQL shown in FIG. 6H to the interrupt data latch circuit 100, the interrupt data latch circuit 100 latches the interrupt data on the data bus 31. Thereafter, the interrupt data latched by the interrupt data latch circuit 100 is supplied to the priority controller 101. Priority set data is also supplied from the priority setting circuit 102 to the priority controller 101. As a result, the priority controller 101 outputs an inactive interrupt enable signal CIEO (FIG. 6D) to the subsequent extended unit. In addition, the priority controller 101 selects interrupt data having the highest priority in accordance with the priority set data and outputs the selected data to the vector generator 104 as mounting position data (slot vector) SLTDAT shown in FIG. 6E.

Consequently, the vector generator 104 generates an interrupt vector including a unit number output from the unit number generator 103 and the slot vector from the priority controller 101. The CPU 1 outputs a read signal RD for reading out the interrupt vector to the timing controller 107. In response to the read signal RD, the timing controller 107 outputs a read gate enable RGEN shown in FIG. 6I to the vector generator 104.

The priority controller 101 also outputs an interrupt generation signal IRSEL to an AND gate 105. Since an active extended unit interrupt enable signal CIEI is also supplied to the AND gate 105, an AND condition is satisfied. Therefore, the AND gate 105 outputs a vector data enable signal VDEN to the vector generator 104. In response to the read gate enable signal RGEN output from the timing controller 107 and the data enable signal VDEN, the interrupt vector generator 104 supplies the interrupt vector to the CPU 1 through the extended data bus.

When the CPU 1 receives the interrupt vector, it supplies a command to a unit designated by the interrupt vector through the data bus so that the unit cancels the interrupt request. The I/O unit internal circuit 301 receives this command and instructs the interrupt request circuit 203 to stop outputting the interrupt request processing signal.

Note that the present invention is not limited to the above embodiment. For example, in the above embodiment, the priority controller 101 determines the priority of interrupt data on the basis of priority data from the priority setting circuit 102. The priority, however, may be determined on the basis of fixed priority data.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A programmable controller, comprising:
   a central processing unit (CPU) for generating data and commands;
   a controlled unit coupled to the CPU and said controlled unit comprised of,
   a plurality of slots into which a plurality of input and output (I/O) devices are mounted;
   a plurality of I/O devices mounted in the slots;
   data bus whose bit lines being connected to the plurality of I/O devices in one-to-one correspondence basis, each bit line of the data bus representing I/O position data indicating into which slot the I/O device is mounted;
   each of the plurality of I/O devices including:
     means for generating an interrupt request signal for interrupting the CPU;
     I/O device position detector means for detecting that I/O device position indicating into which slot the I/O device is mounted and for generating the I/O device position data representing the I/O device position and having a predetermined priority level, wherein the priority levels of the I/O device position data for the plurality of I/O devices is different from each other; and
     means for transferring the I/O device position data from the I/O device position detector means through the corresponding bit of the data bus;
     means for latching simultaneously the I/O device position data transferred by the transfer means;
     means for determining the I/O device having the highest priority level using the I/O device position data latched by the latch means; and
     means for informing the CPU of the I/O device having the highest priority determined by the determining means.

2. A programmable controller, comprising:
   a central processing unit (CPU) for generating data and commands;
   a controlled unit coupled to the CPU and including:
   a plurality of slots into which a plurality of input and output (I/O) devices are mounted;
   a plurality of I/O devices mounted in the slots;
   data bus whose bit lines being connected to the plurality of I/O devices in one-to-one correspondence basis, each bit line of the data bus representing I/O position data indicating into which slot the I/O device is mounted;
   each of the plurality of I/O devices comprised of,
     means for generating an interrupt request signal for interrupting the CPU;
     I/O device position detector means for detecting that I/O device position indicating into which slot the I/O device is mounted and for generating the I/O device position data representing the I/O device position and having a predetermined priority level, wherein the priority levels of the I/O device position data for the plurality of I/O devices is different from each other; and means for transferring the I/O device position data from the I/O device position detector means through the corresponding bit of the data bus;

means for latching simultaneously the I/O device position data transferred by the transfer means;

means for setting arbitrary interrupt level with respect to the I/O devices;

means for determining the I/O device having the highest priority level set by the setting means; and means for informing the CPU of the I/O device having the highest priority determined by the determining means.

3. A programmable controller, comprising:

a central processing unit (CPU) for generating data and commands;

a plurality of controlled units coupled to the CPU, each including:

a plurality of slots into which a plurality of input and output (I/O) devices are mounted;

a plurality of I/O devices mounted in the slots;

data bus whose bit lines being connected to the plurality of I/O devices in one-to-one correspondence basis, each bit line of the data bus representing I/O position data indicating into which slot the I/O device is mounted;

each of the plurality of I/O devices comprised of, means for generating an interrupt request signal for interrupting the CPU;

I/O device position detector means for detecting that I/O device position indicating into which slot the I/O device is mounted and for generating the I/O device position data representing the I/O device position and having a predetermined priority level, wherein the priority levels of the I/O device position data for the plurality of I/O devices is different from each other; and means for transferring the I/O device position data from the I/O device position detector means through the corresponding bit of the data bus;

means for latching simultaneously the I/O device position data transferred by the transfer means;

means for setting arbitrary interrupt level with respect to the I/O devices;

means for determining the I/O device having the highest priority level set by the setting means;

means for generating unit identification data for identifying the control unit interrupting the CPU; and means for transferring the unit identification data to inform the CPU of the controlled unit interrupting thereto and data indicating the I/O device within the controlled unit and having the highest priority determined by the determining means.

* * * * *